US00RE39018E

(19) United States
(12) Reissued Patent
Azuma et al.

(10) Patent Number: US RE39,018 E
(45) Date of Reissued Patent: Mar. 21, 2006

(54) HIGH SPEED METHOD OF ALIGNING CUTTING LINES OF A WORKPLACE USING PATTERNS

(75) Inventors: Masayuki Azuma, Mitaka (JP); Hirofumi Shimoda, Mitaka (JP); Mani Fischer, Haifa (IL)

(73) Assignees: Tokyo Seimitsu Co., Ltd., Tokyo (JP); Kulicke & Soffa Investments, Inc., Wilmington, DE (US)

(21) Appl. No.: 10/053,377

(22) Filed: Jan. 23, 2002

Related U.S. Patent Documents

Reissue of:
(64) Patent No.: 6,142,138
Issued: Nov. 7, 2000
Appl. No.: 09/199,198
Filed: Nov. 25, 1998

(30) Foreign Application Priority Data

Dec. 1, 1997 (JP) ..... 9-330540

(51) Int. Cl.
*B28D 1/04* (2006.01)

(52) U.S. Cl. ..... 125/14; 83/425.2; 83/471.3; 125/13.01; 451/190; 451/194

(58) Field of Classification Search ..... 83/425.2, 83/471.3; 125/12, 13.01, 14, 35; 451/190, 451/194, 195, 197, 200, 201
See application file for complete search history.

(56) References Cited

U.S. PATENT DOCUMENTS 4,416,312 A * 11/1983 Ostberg
4,688,540 A * 8/1987 Ono
5,842,461 A * 12/1998 Azuma ..... 125/13.01

FOREIGN PATENT DOCUMENTS

| | | |
|---|---|---|
| JP | 59-156753 | 10/1984 |
| JP | 1-285805 | 11/1989 |
| JP | 4-363047 | 12/1992 |

* cited by examiner

*Primary Examiner*—Timothy V. Eley
(74) *Attorney, Agent, or Firm*—Nixon Peabody LLP; David S. Safran

(57) ABSTRACT

Two imaging equipment are provided at a pair of cutting blade units, and the two imaging equipment image patterns at first positions in proximity to the center of a wafer at the same time. A controller drives drive mechanisms to align the wafer in such a way that current image patterns at the first positions can match with a reference pattern at the first positions. Then, the two imaging equipment are moved to positions for imaging patterns at second positions at the outer circumference of the wafer to image the patterns at the second positions. The controller drives the drive mechanisms to align the wafer in such a way that current image patterns at the second positions can match with a reference pattern at the second positions.

4 Claims, 7 Drawing Sheets

HIGH SPEED METHOD OF ALIGNING CUTTING LINES OF A WORKPLACE USING PATTERNS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to an alignment method and apparatus applied to a worktable of a semiconductor dicing machine, and more particularly to a wafer alignment method and apparatus of a dicing machine, which cuts a semiconductor wafer ( a workpiece) into squares with a pair of cutting blade units.

2. Description of Related Art

The processing speed of the dicing machine has become higher, whereas the diameter of the semiconductor wafer has become larger. To reduce the processing time, a cutting speed is raised, a return speed is raised, or an alignment speed is raised. Raising the cutting speed, however, may deteriorate the cutting performance, and raising the return speed excessively increases the vibrations of the dicing machine. Thus, raising the cutting speed and the return speed does not achieve dramatic results, and therefore, the best way is raising the alignment speed.

FIG. 7 is a transitional view showing the conventional alignment method. According to FIG. 7, a camera (an imaging means) of low magnification searches a pattern at a position ① in proximity to the center O of the wafer W in FIG. 7(A), and at a position ② a small distance away from the position ①, the camera searches the same pattern as the pattern at the position ①, and rotates the wafer in a direction θ with a rotational driving mechanism to perform the first rough alignment. Then, the camera searches a pattern at a position ③ in proximity to the outer circumference of the wafer W, and rotates the wafer W with the rotational direction driving mechanism to complete the rough alignment.

Next, the camera is switched to the high magnification. The camera searches a pattern at a position ④ in FIG. 7(B) and searches a pattern at a position ⑤. Then, the wafer is rotated in the direction θ to complete the alignment at a channel (CH) 1.

Thereafter, the channel is switched to a channel (CH) 2, and the wafer W is rotated by 90°. The camera searches a pattern at a position ⑥ in FIG. 7(C) and searches a pattern at a position ⑦. The rotation of the wafer in a direction θ completes the fine alignment at CH2, and the alignment of the wafer W is completed. Then, a pair of cutting blade units cut the wafer W.

The conventional wafer alignment method, however, has a problem in that the alignment cannot be performed at high speed since the patterns at the positions ①, ② and ③ must be imaged at three stages.

The conventional wafer alignment method has another problem in that it takes a long time to align the wafer since the camera must be moved in the direction X from the position ④ to ⑤ at CHI and the camera must be moved in the direction X from the position ⑥ to ⑦ at CH2.

SUMMARY OF THE INVENTION

The present invention has been developed in view of the above-described circumstances, and has as its object the provision of the alignment method and apparatus for performing the alignment at high speed.

To achieve the above-mentioned object, the present invention is directed to an alignment method of aligning cutting lines of a workpiece, which depend on patterns such as ICs, with a pair of cutting blades provided at a pair of cutting blade units provided with motors for rotating said pair of cutting blades, the alignment being performed when said pair of cutting blade units cuts said workpiece, said alignment method comprising the steps of: previously registering reference patterns at least one point of low magnification and one point of high magnification on said workpiece located at a preset position; simultaneously imaging patterns at two points in proximity to the center of said workpiece with two imaging means provided at said pair of cutting blade units, and aligning said workpiece such that the imaged current image patterns at said two points can match with said reference patterns; and moving either one of said two imaging means to a position so as to image a pattern at one point at the outer circumference of said workpiece and aligning said workpiece such that the imaged current image pattern at the point can match with said reference patterns.

Furthermore, to achieve the above-mentioned object, the present invention is directed to an alignment apparatus which aligns cutting lines of a workpiece, which depend on patterns such as ICs, with a pair of cutting blades provided at a pair of cutting blade units provided with motors for rotating said pair of cutting blades, the alignment being performed when said pair of cutting blade units cuts said workpiece, said alignment apparatus comprising: workpiece mounting means provided with an X-Y direction driving mechanism and a rotational direction driving mechanism; two imaging means provided at said pair of cutting blade units and imaging patterns on said workpiece mounted on said workpiece mounting means; storage means in which reference patterns at least at one point of low magnification and one point of high magnification on said workpiece located at a preset position are registered in advance; pattern matching means for comparing current image patterns from said two imaging means and said reference patterns of the low magnification and the high magnification stored in said storage means and outputting a pattern matching signal; and control means for driving said workpiece mounting means in accordance with the output of said pattern matching means to align said workpiece at a desired position.

According to the present invention, the reference pattern at one point on the workpiece located at a preset position is registered in the storage means. Then, the patterns at two points in proximity to the center of the workpiece are imaged at the same time by the two imaging means which are provided at the pair of cutting blade units, and the control means drives the work mounting means so that the picked-up current image patterns at the two points can match with the reference pattern, thus aligning the workpiece. Next, either one of two imaging means is moved to a position to image a pattern at one point at the outer circumference of the workpiece. The control means drives the work mounting means so that the picked-up current image pattern at the point can match with the reference pattern, thus aligning the workpiece, and the alignment of the workpiece is completed. According to the present invention, the pair of cutting blade units are provided with the imaging means, and the two imaging means simultaneously image the patterns at two points in proximity to the center of the workpiece so as to align the workpiece. Compared with the conventional alignment method in which the patterns are imaged on a point-by-point basis, the alignment can be performed at higher speed in a shorter period of time.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings with reference to the accompanying drawings.

Figure 1:
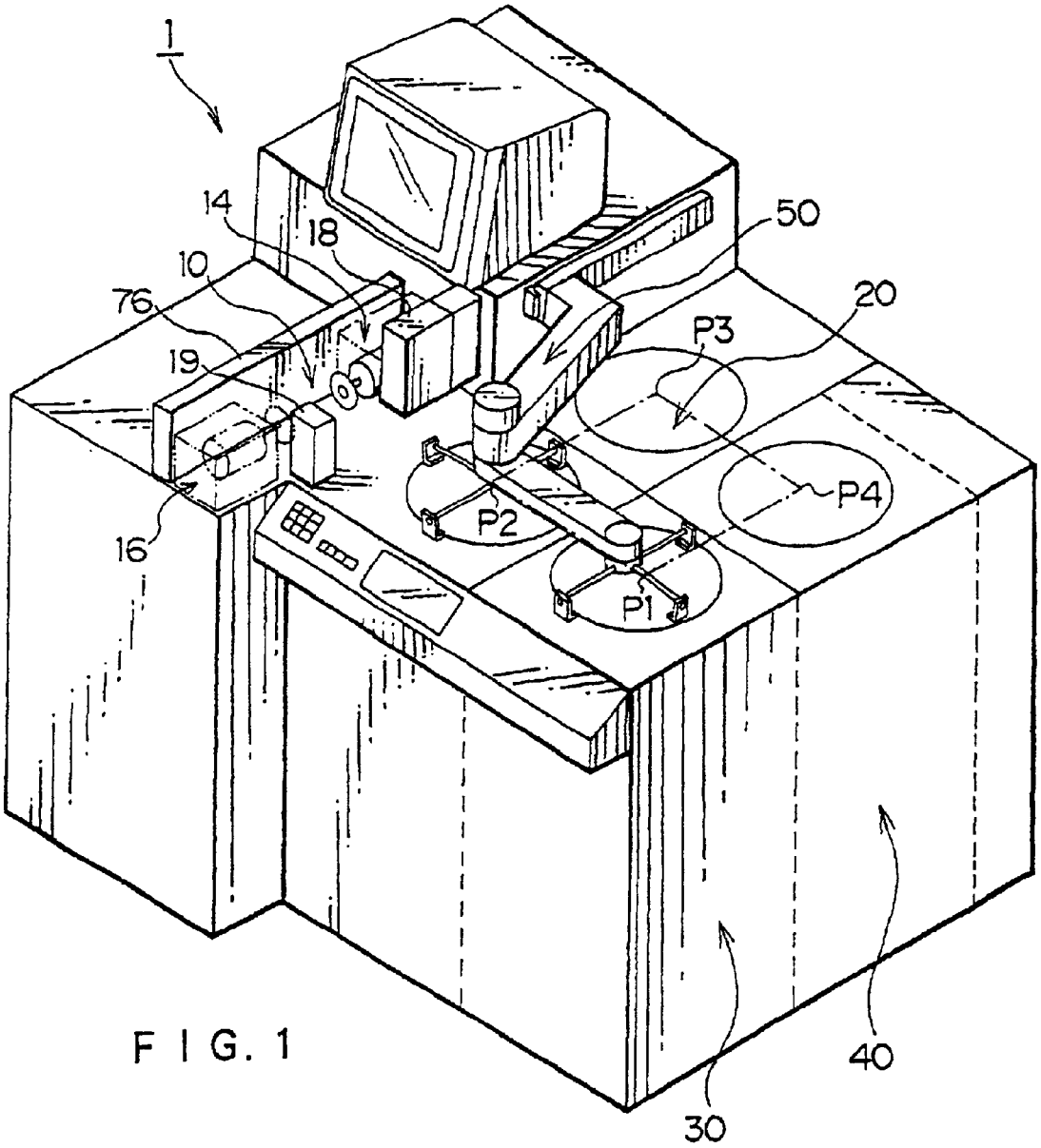
FIG. 1 is a perspective view illustrating the dicing machine according to the present invention.
Figure 2:
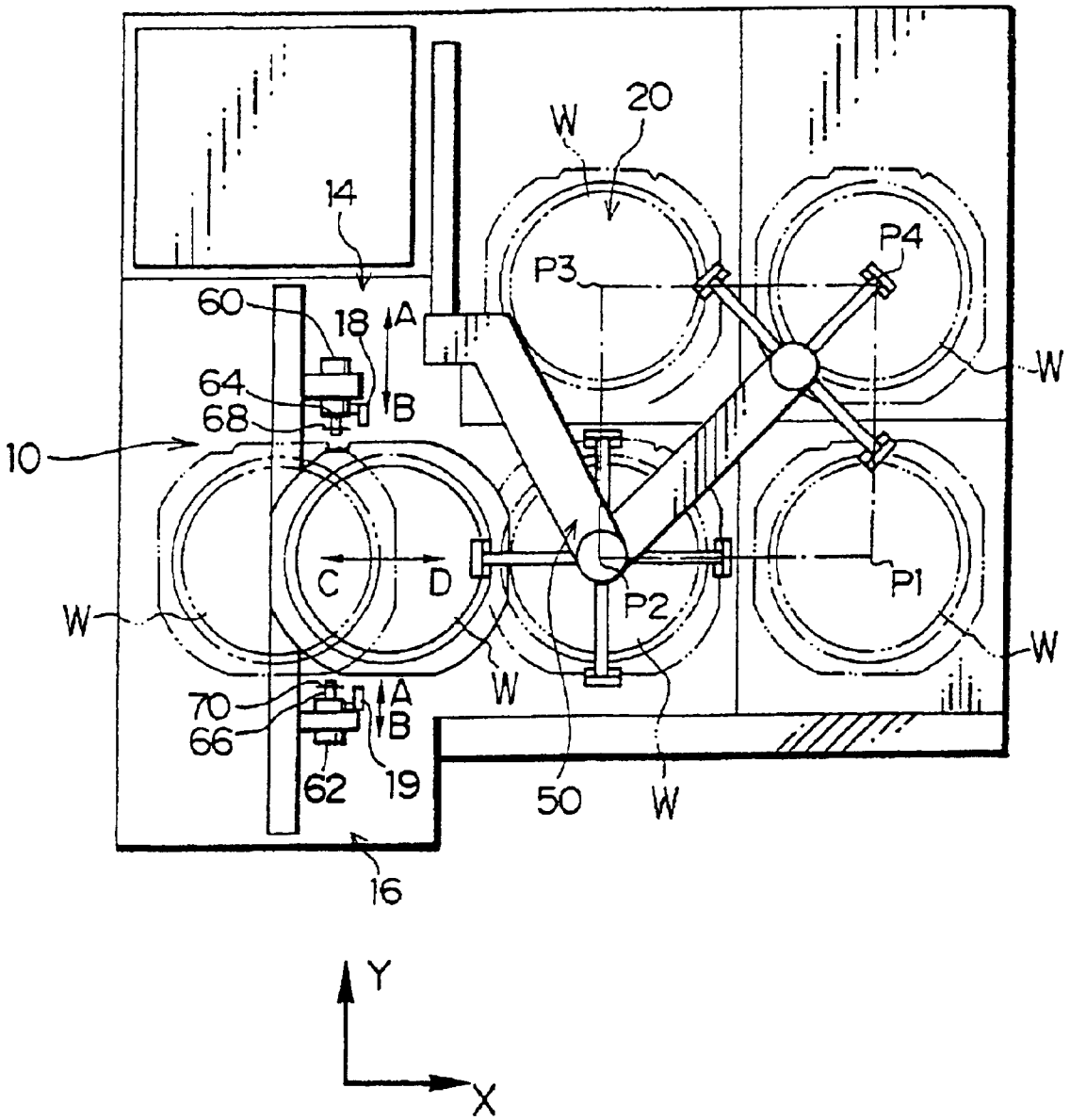
FIG. 2 is a plan view of the dicing machine in FIG. 1.

FIG. 1 is a perspective view of a dicing machine 1 for a semiconductor wafer according to the present invention, and FIG. 2 is a plan view of the dicing machine 1. As shown in FIG. 1, the dicing machine 1 is comprised mainly of a cutting part 10, a cleaning part 20, a cassette housing part 30, an elevator part 40 and transport equipment 50.

A description will be given of a cutting process of the dicing machine 1. First, a plurality of wafers W, which are housed in the cassette housing part 30, are sequentially retrieved by the elevator part 40, and the retrieved wafer W is set at a position P4 in FIG. 2. The wafer W is placed on a cutting table (position P2: see FIG. 4) 12 of the cutting part 10 via a pre-load stage at a position P1. The wafer W is vacuumed to the cutting table 12. Imaging equipment 18, 19 for alignment recognize patterns on the wafer W as images, and the wafer W is aligned in accordance with the recognition. The alignment method and apparatus will be described later.

The movement of the cutting part 10 along the Y-axis indicated by an arrow A-B and the movement of the cutting table 12 along the X-axis indicated by an arrow C-D cuts the aligned wafer W along two streets at the same time. Then, the cutting blade units 14, 16 are moved by a pitch of the street. The cutting table 12 is moved again along the X-axis so as to cut the wafer W along the next two streets. The cutting is repeated. After the wafer W is cut along all the streets in one direction (along the X-axis), the cutting table 12 is turned 90° to cut the wafer W along streets in the other direction (along the Y-axis in FIG. 2) perpendicular to the already-cut streets. Consequently, the wafer W is cut into squares.

On completion of the cutting, the cutting table 12 moves to return the wafer W to the position P2, and the transport equipment 50 transports the wafer W to a spin table of the cleaning part 20. The wafer W is cleaned by cleaning water and is dried by air. The transport equipment 50 transports the dried wafer W to a position P4, and the elevator part 40 houses the wafer W in the cassette housing part 30.

Figure 3:
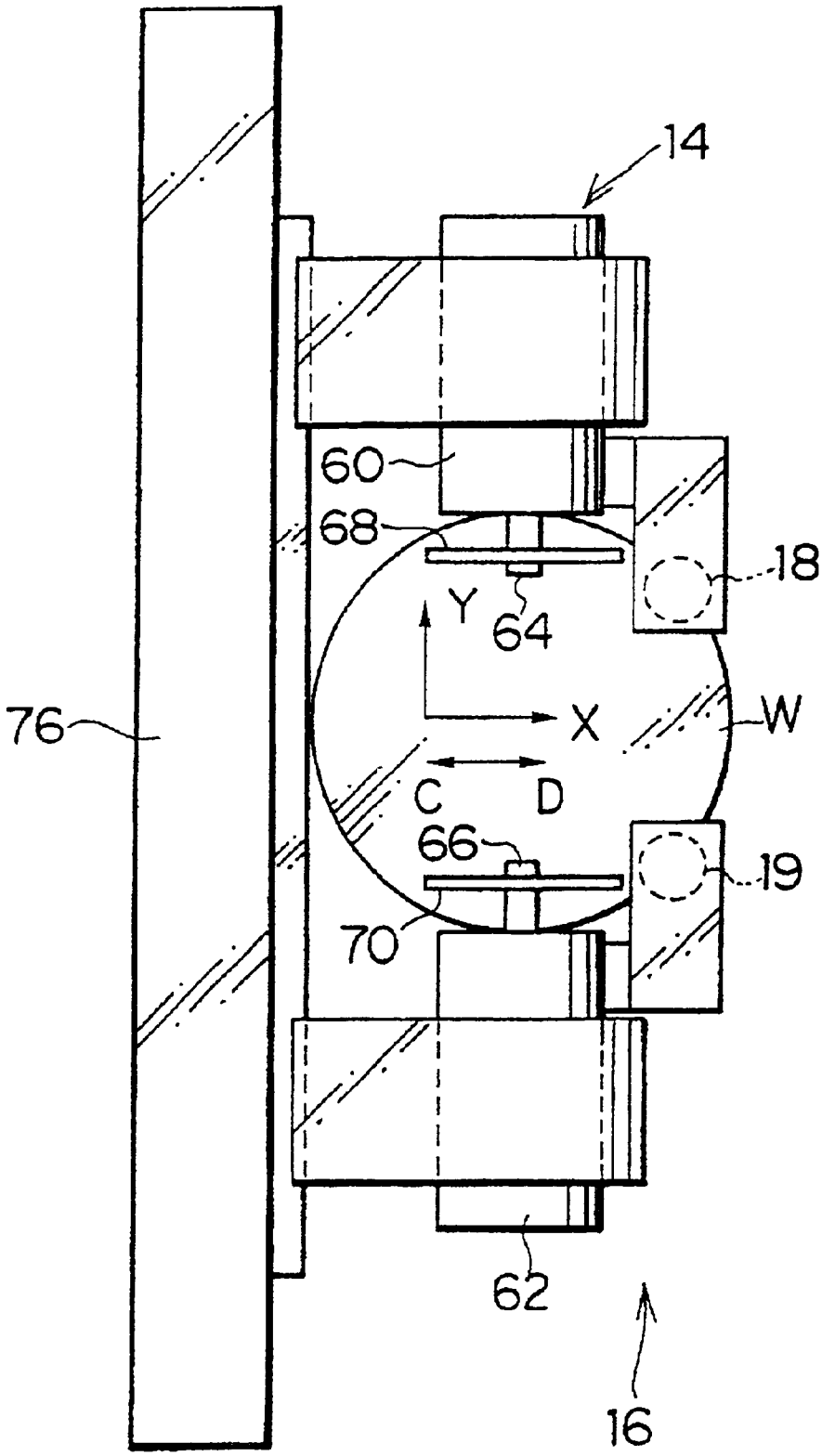
FIG. 3 is a plan view of a cutting part in the dicing machine.

A description will now be given of the cutting part 10 of the dicing machine 1. FIG. 3 is a plan view of the cutting part 10. The cutting blade units 14, 16 of the cutting part 10 in FIG. 3 are provided with motors 60, 62; spindles 64, 66; and blades 68, 70 which are attached to the ends of the spindles 64, 66. A spindle movement mechanism moves the cutting blade units 14, 16 independently of one another along the Y-axis. A linear motor is used for the spindle movement mechanism, and the structure of the linear motor is well known.

Figure 4:
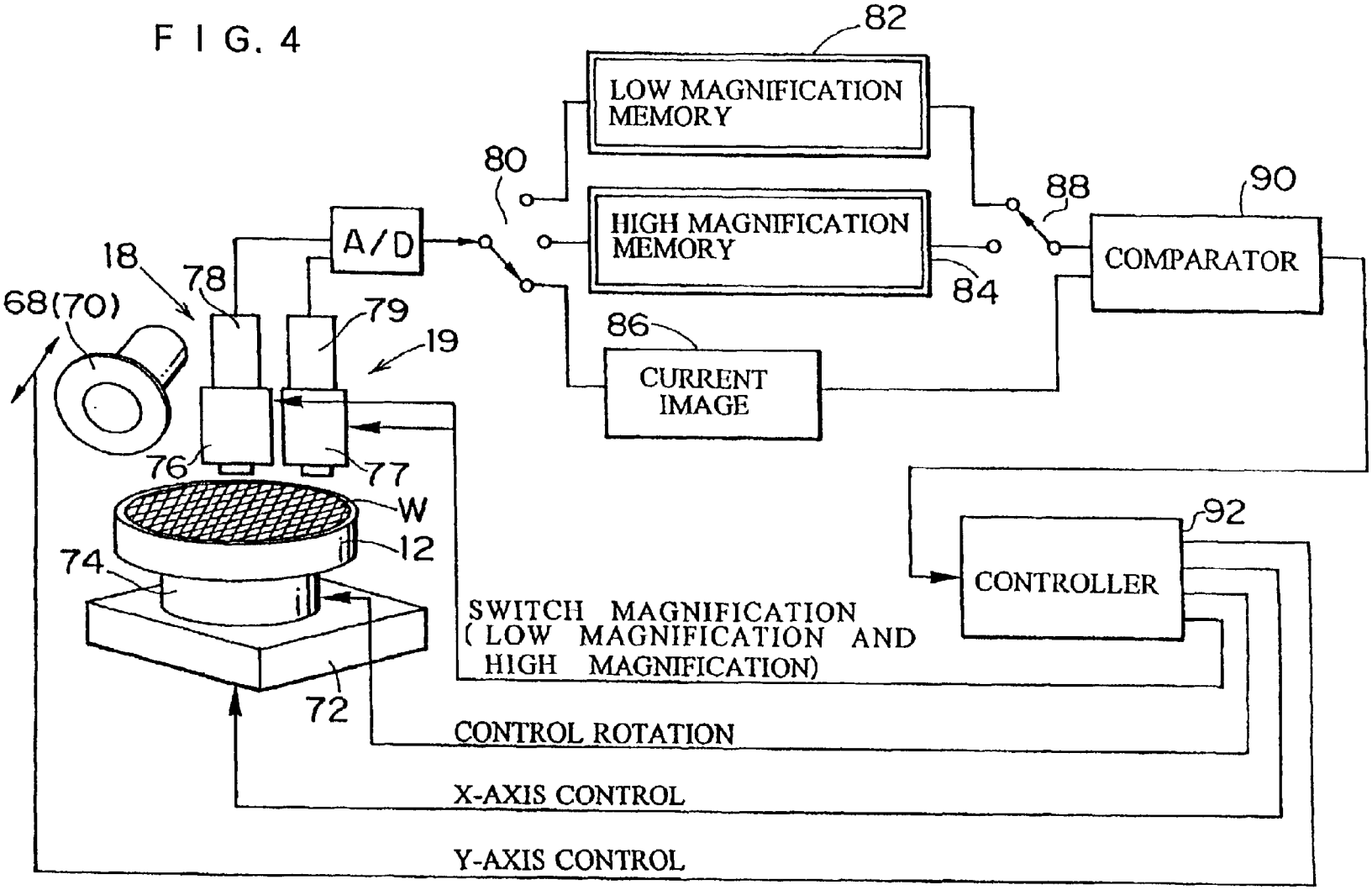
FIG. 4 is a block diagram illustrating the alignment equipment of the dicing machine.

The imaging equipment 18 in FIG. 4 is provided at the cutting blade unit 14 in FIG. 3, and the imaging equipment 19 is provided at the cutting blade unit 16. The imaging equipment 18, 19 are capable of moving along the Y-axis together with the blades 68, 70.

A description will be given of the structure of the alignment equipment of the wafer W in FIG. 4.

As shown in FIG. 4, the wafer W is vacuumed to the cutting table 12. An X-Y driving mechanism 72 drives the cutting table 12 in the direction X-Y, and a rotational driving mechanism 74 rotates the cutting table 12 at a predetermined angle θ. An air vacuuming mechanism (not illustrated) is provided at the top of the cutting table 12, and the air vacuuming mechanism vacuums the wafer W on the cutting table 12. The blades 68, 70 cut the wafer W along cut lines. The imaging equipment 18, 19 are provided above the cutting table 12. The imaging equipment 18 consists of a microscope 76 and an imaging part 78, and an image signal from the imaging part 78 is ND converted, and the image signal is transmitted to one of a low magnification frame memory 82, a high magnification frame memory 84 and a current image frame memory 86 in accordance with the switching of a switching device 80. Likewise, the imaging equipment 19 consists of a microscope 77 and an imaging part 79. An image signal from the imaging part 79 is A/D converted, and the image signal is transmitted to one of a low magnification frame memory 82, a high magnification frame memory 84 and a current image frame memory 86 in accordance with the switching of the switching device 80.

The low magnification frame memory 82 connects to a comparator 90 through a switching device 88, and the high magnification frame memory 84 connects to the comparator 90 through the switching device 88. The current image frame memory 86 directly connects to the comparator 90.

The comparator 90 performs a pattern matching process, and outputs a pattern matching signal to a controller 92. The controller 92 is provided with an external input means such as a keyboard. The controller 92 switches he magnifications of the microscopes 76, 77 in accordance with a designation signal which is input from the external input means, and controls the X-Y driving mechanism 72 and the rotational driving mechanism 74 in accordance with signals from the comparator 90.

A description will be given of the procedure for registering reference patterns prior to the alignment.

First, the data (e.g., the type, the diameter, the thickness, and the pitch of the cutting lines) on the wafer W subject to processing is input to the controller 92 from the external input means. Then, a master wafer or the wafer W subject to processing is placed on the cutting table 12. Then, the spindle moving mechanism moves the microscope 76 (or the microscope 77) at low magnification to a pattern position of low magnification. The imaging part 78 images the low magnification pattern, and a reference low magnification pattern is stored and registered in the low magnification frame memory 82. In this case, the position and shape of the pattern are stored in the low magnification frame memory 82.

Then, the controller 92 transmits a command to instruct the microscope 76 to switch to the high magnification, and the microscope 76 is moved to a pattern position of high magnification pattern. Then, the changeover switch 80 switches to the high magnification memory 84, where a reference high magnification pattern is stored and registered. In this case, the position and shape of the pattern are stored in the high magnification frame memory 84. The registration of two patterns of low magnification and high magnification is completed.

Figure 5:
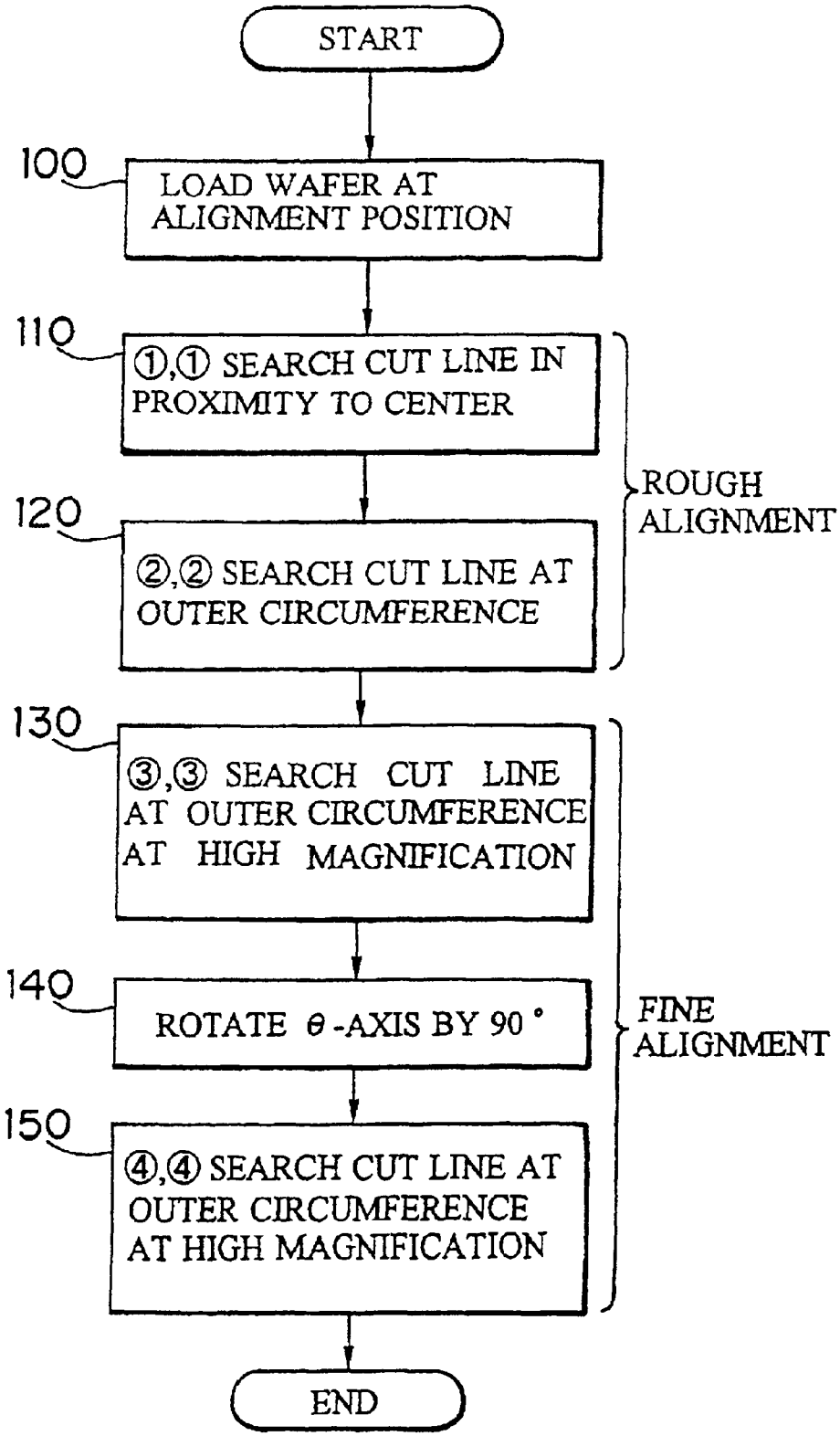
FIG. 5 is a flow chart showing the wafer alignment method.
Figure 6A:
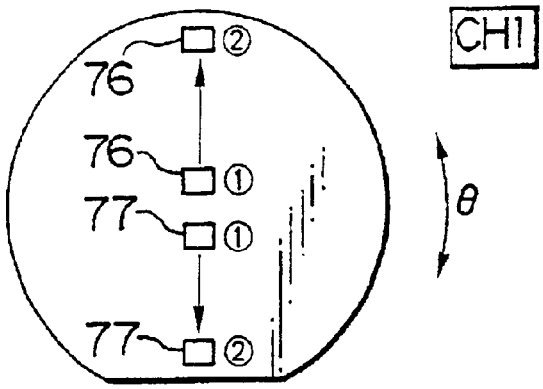
FIGS. 6(A), 6(B) and 6(C) are transitional views showing a wafer alignment procedure.
Figure 6B:
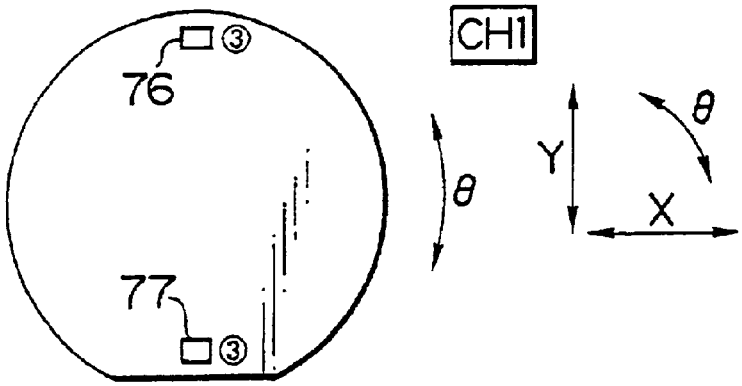
Figure 6C:
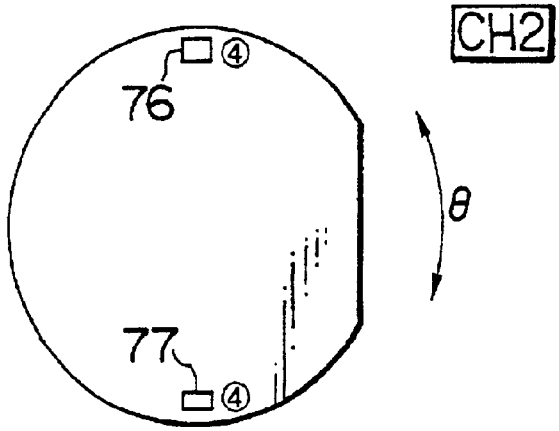
Figure 7A:
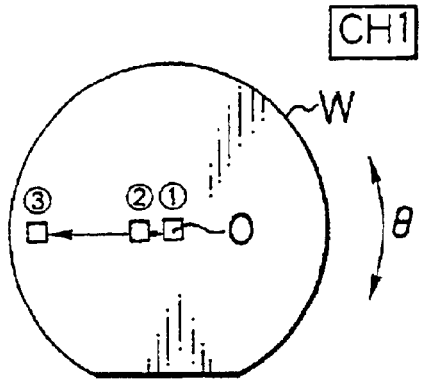
FIG. 7(A) PRIOR ART
FIGS. 7(A), 7(B) and 7(C) are transitional views showing a conventional wafer alignment procedure.
Figure 7B:
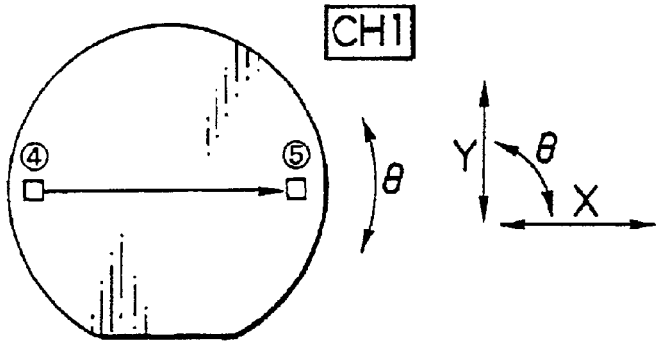
FIG. 7(B) PRIOR ART
Figure 7C:
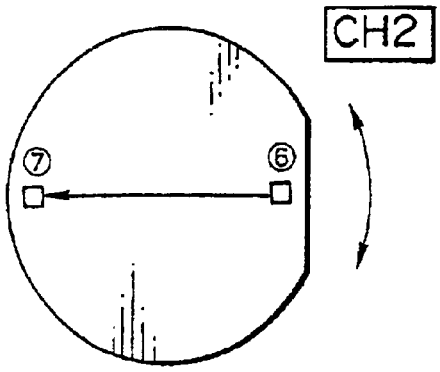
FIG. 7(C) PRIOR ART

A description will be given of the method of aligning the wafer in accordance with the reference patterns which are registered in the above-mentioned manner with reference to FIGS. 5 and 6.

At step S100, the wafer W on the cutting table 12 is moved to an alignment position, and the microscopes 76, 77 are moved to alignment positions in a channel 1. Then, a rough-alignment of the wafer is performed in accordance with the low magnification pattern in the channel 1 at the step S110. Specifically, as shown in FIG. 6(A), the two microscopes 76, 77 are moved to the positions ① and ① in proximity to the center O of the wafer W, and two patterns at these positions are imaged at the same time. On the other hand, in the alignment equipment, the reference low magnification pattern is transmitted from the low magnification frame memory 82 to the comparator 90, and the current image patterns at the positions ① and ①, which are imaged by the microscopes 76, 77, are transmitted from the current image frame memory 86 to the comparator 90. The comparator 90 performs a pattern matching process, and the results are transmitted to the controller 92. The controller 92 performs a rough alignment by driving the X-Y drive mechanism 72 and the rotational driving mechanism 74 so that the current image patterns can match with the reference low magnification pattern, and the rough alignment in accordance with the reference low magnification pattern is completed.

Next, the rough alignment based on the low magnification pattern is performed in the channel 1 at step S120. Specifically, as shown in FIG. 6(A), the two microscopes 76, 77 are moved to positions ② and ② in proximity to the outer circumference of the wafer W, and two patterns at these positions are imaged at the same time. On the other hand, in the alignment equipment, the reference low magnification pattern is transmitted from the low magnification frame memory 82 to the comparator 90, and the current image patterns at the positions ② and ②, which are imaged by the microscopes 76, 77, are transmitted from the current image frame memory 86 to the comparator 90. Then, the comparator 90 performs the pattern matching process, and the results are transmitted to the controller 92. The controller 92 performs the rough alignment by driving the X-Y driving mechanism 72 and the rotational driving mechanism 74 so that the current image patterns can match with the reference low magnification pattern, and the rough alignment in accordance with the low magnification pattern is completed.

Next, a fine alignment is performed in accordance with the high magnification pattern in the channell at step 130. Specifically, the switching device 88 is switched to the high magnification frame memory 84 side, and the two microscopes 76, 77 in FIG. 6(B) are switched from the low magnification to the high magnification in a stationary state at the positions ② and ② (the positions ③ and ③), and two patterns at the positions ③ and ③ are imaged. In the alignment equipment, the reference high magnification pattern is transmitted from the high magnification frame memory 84 to the comparator 90, and the current image patterns at the positions ③ and ③, which are imaged by the two microscopes 76, 77, are transmitted from the current image frame memory 86 to the comparator 90. The comparator 90 performs the pattern matching process, and the results are transmitted to the controller 92. The controller 92 performs the fine alignment by driving the X-Y driving mechanism 72 and the rotational driving mechanism 74 so that the reference high magnification pattern can match with the current image pattern, and the fine alignment in the channel 1 is completed.

Next, the channel 1 is switched to the channel 2, and the cutting table 12 is turned 90° by the rotational driving mechanism 74. The fine alignment is performed in accordance with the high magnification pattern in the channel 2 at step S150. Specifically, the cutting table 12 is turned 90° with the two microscopes 76, 77 in a stationary state at the positions ③ and ③, and two patterns at the positions ④ and ④ are imaged. In the alignment equipment, the reference high magnification pattern in the channel 2 is transmitted from the high magnification frame memory 84 to the comparator 90, and the current image patterns at the positions ④ and ④, which are imaged by the microscopes 76, 77, are transmitted to the comparator 90. The comparator 90 performs the pattern matching process, and the results are transmitted to the controller 92. The controller 92 performs the fine alignment by driving the X-Y driving mechanism 72 and the rotational driving mechanism 74 so that the reference low magnification pattern can match with the current image patterns. The alignment equipment of this invention finishes aligning the wafer W.

As stated above, according to the alignment method of this embodiment, the imaging equipment 18, 19 are provided at a pair of cutting blade units 14, 16, and the two imaging equipment 18, 19 image the patterns at two points in proximity to the center of the wafer W so as to align the wafer W. For this reason, compared with the conventional alignment method wherein the patterns are imaged on a point-by-point basis, the alignment can be performed at higher speed in a shorter period of time.

In this embodiment, two imaging equipment image the patterns at two positions ③ and ③ in the rough alignment. The present invention, however, should not be restricted to this. One imaging equipment may image only one pattern at one point to align the wafer.

Moreover, in this embodiment, the reference low magnification pattern and the reference high magnification pattern can be imaged without the necessity for moving the imaging equipment 18, 19. For this reason, the processing time can be reduced dramatically compared with the conventional alignment apparatus in which the imaging equipment must be moved to each pattern subject to imaging.

As set forth hereinabove, according to the alignment method and apparatus of this invention, the pair of cutting blade units are provided with the imaging means, and the two imaging means image the patterns at two points in proximity to the center of the workpiece at the same time to align the wafer. For this reason, compared with the conventional alignment method wherein the patterns are imaged on a point-by-point basis, the alignment can be performed at higher speed in a shorter period of time.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of aligning cutting lines of a workpiece, which depend on patterns, with a pair of cutting blades provided at a pair of cutting blade units provided with motors for rotating said pair of cutting blades, the alignment being performed when said pair of cutting blade units cuts said workpiece, said alignment method comprising the steps of:

registering reference patterns at at least one point of low magnification and one point of high magnification on said workpiece located at a preset position;

simultaneously producing images of patterns at two points in proximity to the center of said workpiece with two imaging means provided at said pair of cutting blade units, and aligning said workpiece such that the images of the patterns at said two points can match with said reference patterns; and moving either one of said two imaging means to a position so as to produce an image of a pattern at one point at the outer circumference of said workpiece and aligning said workpiece such that the image of the pattern at the point at the outer circumference can match with said reference patterns.

2. The method as defined in claim 1, further comprising the steps of producing images of reference patterns of the low magnification and the high magnification on said workpiece with the use of said two imaging means after having registered the reference patterns of the low magnification and the high magnification.

3. A method of aligning cutting lines of a workpiece, which depend on patterns, with a pair of cutting blades provided at a pair of cutting blade units provided with motors for rotating said pair of cutting blades, the alignment being performed when said pair of cutting blade units cuts said workpiece, said alignment method comprising the steps of:

registering reference patterns at at least one point of low magnification and one point of high magnification on said workpiece located at a preset position;

simultaneously producing images of patterns at two points in proximity to the center of said workpiece with two imaging means provided at said pair of cutting blade units, and aligning said workpiece such that the images of the patterns at said two points can match with said reference patterns of the low magnification;

moving at least one of said two imaging means to a position so as to produce an image of a pattern at one point at the outer circumference of said workpiece and aligning said workpiece such that the image of the pattern at the point at the outer circumference can match with said at least one reference pattern of the low magnification;

switching the magnification from the low magnification to the high magnification, producing a second image of a pattern at one point at the outer circumference of said workpiece with said at least one of said two imaging means, and aligning said workpiece so that the second image at the point at the outer circumference can match with said at least one reference pattern of high magnification; and rotating said workpiece 90°, producing a rotated image of a pattern at one point at the outer circumference of said workpiece with said at least one of said two imaging means, and aligning said workpiece so that the rotated image at said one point can match with said at least one reference pattern of high magnification.

4. The method as defined in claim 2, further comprising the steps of producing images of reference patterns of the low magnification and the high magnification on said workpiece with the use of said two imaging means after having registered the reference patterns of the low magnification and the high magnification.

* * * * *